(12) United States Patent
Holleman

(10) Patent No.: US 7,261,629 B2
(45) Date of Patent: Aug. 28, 2007

(54) POULTRY WING SEPARATOR AND PARTIAL DEBONER

(75) Inventor: Leen Holleman, Oude-Tonge (NL)

(73) Assignee: Systemate Group, B.V., Numansdorp (NL)

( * ) Notice: Subject to any disclaimer, the term of this patent is extended or adjusted under 35 U.S.C. 154(b) by 0 days.

(21) Appl. No.: 10/766,123

(22) Filed: Jan. 28, 2004

(65) Prior Publication Data

US 2005/0186897 A1 Aug. 25, 2005

(51) Int. Cl.
*A22C 17/02* (2006.01)
(52) U.S. Cl. .................................. 452/135; 452/154
(58) Field of Classification Search ............. 452/135, 452/136, 138, 139, 140, 154, 155
See application file for complete search history.

(56) References Cited

U.S. PATENT DOCUMENTS

| | | | | |
|---|---|---|---|---|
| 3,412,425 A | * | 11/1968 | Sturm | 452/138 |
| 3,470,581 A | * | 10/1969 | Hopkins | 452/149 |
| 4,207,653 A | * | 6/1980 | Gasbarro | 452/169 |
| 4,213,229 A | * | 7/1980 | Helmer et al. | 452/135 |
| 4,577,368 A | * | 3/1986 | Hazenbroek | 452/165 |
| 4,736,492 A | | 4/1988 | Hazenbroek et al. | 17/46 |
| 4,780,930 A | * | 11/1988 | Sparkia | 452/165 |
| 4,893,378 A | | 1/1990 | Hazenbroek et al. | 17/46 |
| 4,993,113 A | | 2/1991 | Hazenbroek | 452/136 |
| 5,067,927 A | * | 11/1991 | Hazenbroek et al. | 452/136 |
| 5,173,076 A | | 12/1992 | Hazenbroek | 452/135 |
| 5,232,397 A | * | 8/1993 | Gagliardi, Jr. | 452/169 |
| 5,267,891 A | * | 12/1993 | Cresson et al. | 452/136 |
| 5,368,519 A | * | 11/1994 | Curtis et al. | 452/135 |
| 5,490,812 A | * | 2/1996 | Schaarschmidt | 452/138 |
| 5,494,479 A | * | 2/1996 | Lindert et al. | 452/135 |
| 5,496,210 A | * | 3/1996 | Davis | 452/169 |
| 5,569,069 A | * | 10/1996 | Horst et al. | 452/169 |
| 5,782,685 A | | 7/1998 | Hazenbroek et al. | 452/138 |
| 5,865,672 A | | 2/1999 | Hazenbroek | 452/138 |
| 5,976,004 A | | 11/1999 | Hazenbroek | 452/136 |
| 6,024,636 A | | 2/2000 | Hazenbroek et al. | 452/138 |
| 6,277,020 B1 | * | 8/2001 | Stephens | 452/135 |

FOREIGN PATENT DOCUMENTS

JP         60-118140         *   6/1985

* cited by examiner

*Primary Examiner*—David J. Parsley
(74) *Attorney, Agent, or Firm*—Thomas, Kayden, Horstemeyer & Risley, LLP

(57) ABSTRACT

Poultry wings are suspended by their tip segments and oriented so that their outside surfaces face one side of the processing path, with right wings oriented with their elbows leading, and left wings oriented with their elbows trailing. The lower, primary segments are bent at the elbow joints by a bending guide, laterally and upwardly about an elbow guide, opening the elbow joints. The open joints are cut so as to release the primary segments. The mid-wing segments are compressed and the bone ends are moved laterally from the wing tip segments, causing the bone ends of the mid-wing segments to pop out of the tip segments. In both instances, the bones of the segments are exposed in the final products, so when the products are cooked, the exposed bone ends are free of grease, etc. and are suitable for grasping by the fingers of the hand for eating as finger food.

11 Claims, 8 Drawing Sheets

POULTRY WING SEPARATOR AND PARTIAL DEBONER

FIELD OF THE INVENTION

This invention concerns a poultry wing segment separator and deboning system for separating segments of the wings of poultry carcasses, and for deboning an end portion of the segments, leaving the end portions of the bones of the segments exposed.

BACKGROUND OF THE INVENTION

The use of poultry wings is somewhat limited because the amount of meat in the wing segments is relatively small when compared to other parts of the poultry carcass, and because the wing segments contain bones that are difficult to remove. This causes the use of poultry wings to be less economical than the use of other available poultry parts and parts of other carcasses.

Because of these problems, poultry wings and wing segments have been eaten by holding the cooked wings or wing segments in the hands and eating the meat away from the bones. While this use of poultry wings and wing segments is economical because the products do not have to be deboned before consumption, the wings are somewhat difficult to eat, particularly because the person eating the wings must grasp the wing with his or her hands, leaving a residue of grease or other undesirable matter on the hands.

In recent years, it has become desirable to produce cooked poultry wing segments with an end portion of the bones of the segments exposed. During the cooking process, the grease and other undesirable matter that is present on the exposed ends of the bones is evaporated or otherwise dissipated, leaving a relatively dry bone end for grasping by the hand of the person to eat the meat from the bone. Also, during the cooking process, the meat usually shrinks and moves away from the exposed bone end, increasing the amount of exposed bone.

At first, the separation of the wing segments from one another and pulling the meat away from a bone end was performed by hand. However, the hand operations were expensive and, therefore, the process was not economical.

More recently, efforts have been made to automatically separate wing segments of poultry products from one another and to retract the meat from about an end portion of the bone of the wing segments. When the wing segments are cooked, this achieves the desired end result of producing a cooked wing segment having a bone end exposed and substantially dry for handling by the person consuming the meat from the wing. However, the small size of the poultry wings and wing segments causes the process of producing the product to become cumbersome, unreliable, and uneconomical. This invention is directed to the solution of the problems associated with this process.

SUMMARY OF THE INVENTION

Briefly described, the present invention concerns a method and apparatus for separating the segments of poultry wings from one another and deboning an end of the bones of the segments, leaving the end portions of the bones exposed. The products are later cooked so as to evaporate or otherwise diminish the residue of grease, etc. on the exposed bone ends, making them more suitable for grasping by the person that consumes the meat from the bone.

The poultry wings are received independently from the carcass, having been previously separated from the carcasses. The wing comprises the primary segment that was separated from the carcass, the mid-wing segment that is connected by an elbow joint to the primary segment, and a tip segment that is connected to the mid-wing segment by a tip joint. The primary segment is elongated and has a bone extending longitudinally there through. The mid-wing segment is also elongated and has two bones extending there through. The tip segment contains less edible meat than the other segments, and is substantially flat. Therefore, the method and apparatus described herein concentrates on the mid-wing segments and primary segments of the wings.

A plurality of poultry wings are moved sequentially through a processing path, by suspending each wing from its tip segment and moving them along the processing path. Each wing segment is oriented so that its elbow joint is either leading or following in the processing path so that the outside of all of the poultry wings face one side of the processing path. As the wings are advanced, the mid-wing segments are maintained upright and the primary segments of the wings, which are lowermost, are bent at the elbow joint laterally and upwardly about an elbow guide that is positioned on the outside of the mid-wing joints of the poultry wings. The bending of the primary segments is in a direction extending outside of and about the elbow guide and continues until the end of the mid-wing bone at the elbow joint is opened away from the mid-wing segment, about the elbow guide. As the elbow joint is opened, the bone end at the elbow joint of the primary segment moves away from the bone end of the mid-wing segment and becomes positioned beside the bone end of the mid-wing segment having been urged laterally about the elbow guide. The tissue extending from the mid-wing segment to the primary segment at the elbow joint becomes stretched away from the bone end of the primary segment, with less tissue remaining at the bone end of the primary segment than at the bone end of the mid-wing segment. The stretched tissue is separated, as by cutting, and the meat at the ends of the bones of the primary segments tend to retract about the ends of the bones of the primary segments. This leaves the ends of the bones of the primary segments exposed. The meat at the ends of the bones of the mid-wing segments tends to remain at the ends of the mid-wing segments.

A similar process is performed between the mid-wing segment and the tip segment, leaving the bone end of the mid-wing segment adjacent the tip segment exposed.

In a preferred embodiment, the step of suspending the poultry wings from their tip segments comprise wedging the tip segments into the slots of shackles, and advancing the shackles along the processing line. There are lateral protrusions in the tip segments that help retain the tip segments in the slots of the shackles. The mid-wing segments and the primary segments become suspended below the tip segments until the bending and joint separation functions begin.

Another feature of a preferred embodiment of the invention is to advance the wings along a substantially rectilinear path to a rotary guide, and then place the mid-wing segment of the wing in contact with the rotary guide so as to stabilize the wing during the later-performed functions of the system.

Another feature of a preferred embodiment of the invention is to advance the wings about the rotary guide at a faster speed than the speed at which the wings are advanced toward the rotary guide, so pushing blocks carried by the rotary guide positively register with the poultry wings, so as to stabilize the wings with the pushing blocks through the subsequent steps of the process.

These and other features of the invention will become apparent upon reviewing the following specification when taken in conjunction with the accompanying drawings.

DETAILED DESCRIPTION

Figure 1:
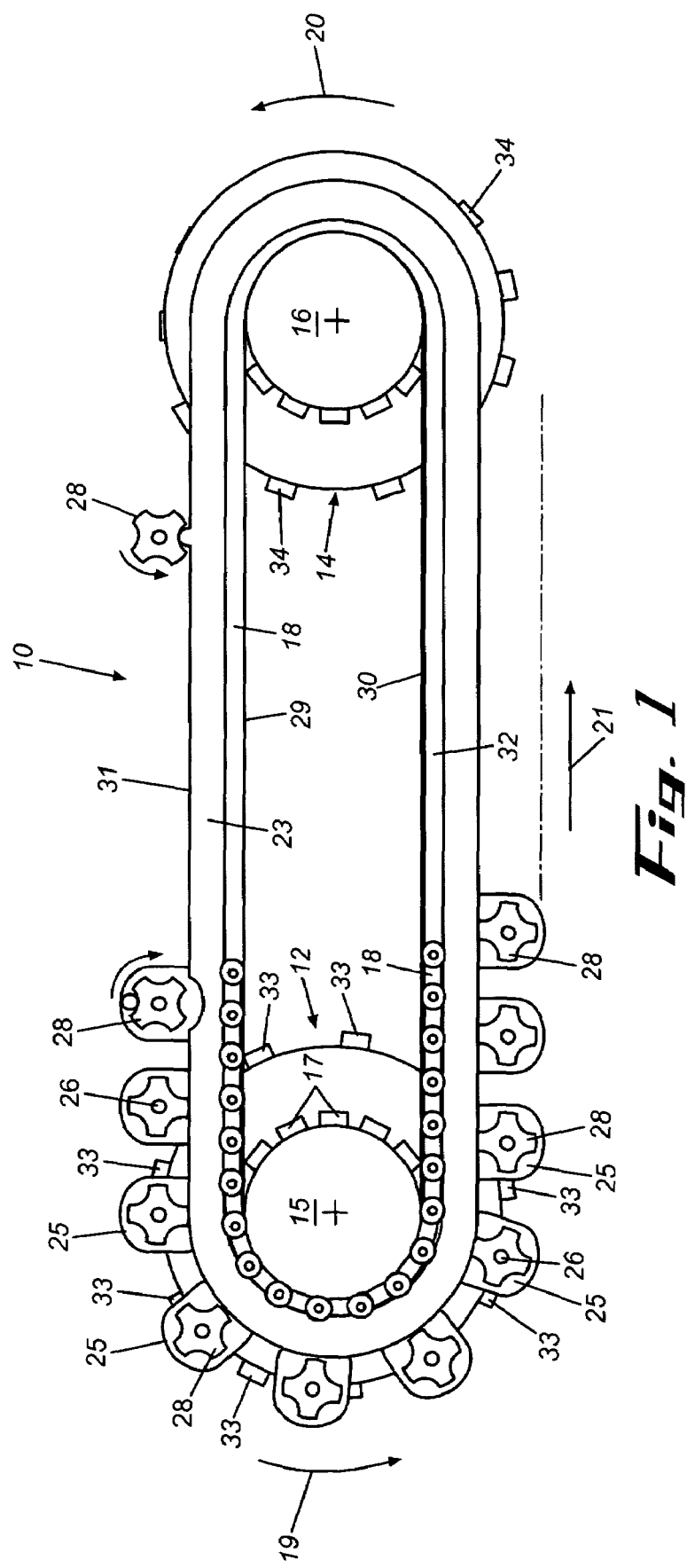
FIG. 1 is a top view of the poultry wing separator and partial deboner.

Referring now in more detail to the drawings, in which like numerals indicate like parts throughout the several views, FIG. 1 illustrates the top of the poultry wing separator and partial deboner 10, showing the drive system for moving the shackles in series along the processing path.

Primary segment rotary guide 12 is operatively connected to the mid-wing segment rotary guide 14 by drive gear 15, driven gear 16, the teeth 17 of the gears, and continuous drive chain 18. The teeth 17 of the drive gear and driven gear mesh with the chain, and a motor or other source of power (not shown) is connected to drive gear to impart rotary movement to the drive gear, drive chain and driven gear as indicated by direction arrows 19, 20 and 21 about upright axes 22A and 22B.

Figure 2:
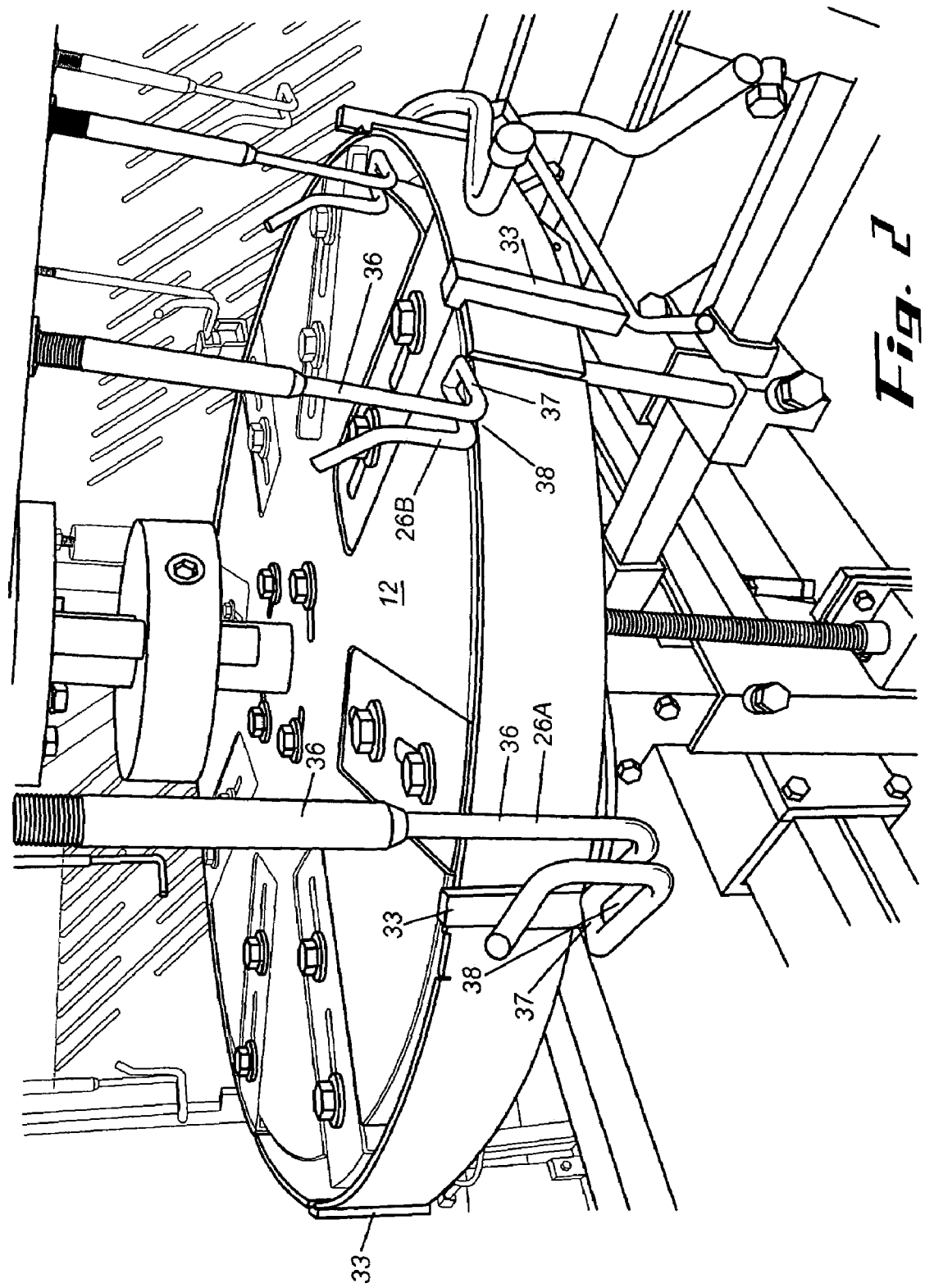
FIG. 2 is a perspective illustration of the rotary guide used for separating the primary segment from the mid-wing segment.

The drive chain 18 is driven adjacent a cam track 23 that extends about the drive and driven gears 15 and 16, and shackle supports 25 are carried at spaced intervals by the drive chain and project on the opposite side of the cam track 23 from the drive chain 18. Shackles, such as shackles 26A and 26B of FIG. 2, are rotatably supported by the shackle supports and are oriented in a vertical attitude. The upper ends of the shackles 26 are each connected to a turning gear 28 that functions to rotate its shackle.

The rectilinear segments 29 and 30 of the continuous drive chain form a front or loading side 31 and a rear side 32. Workers hand-load the shackles with poultry wings at the loading side 31 as the shackles move in the direction of arrows 19–21 from driven gear 16 to drive gear 15.

Rotary guides 12 and 14 are of larger diameter than the breadth of the continuous drive chain 18. This means that the shackle supports 25 and their shackles travel at a slower speed than the speed of the periphery of the rotary guides 12 and 14. It will be noted that the shackles 26 extend laterally from the continuous drive chain 18 so that when the shackle supports 25 and the shackles 26 carried thereby reach the rotary guides 12 and 14 and begin to move around the arcs illustrated by direction arrows 19 and 20, the speed of movement of the shackles increases.

The rotary guides 12 and 14 each include a plurality of guide blocks 33, 34 for guiding the wings as they travel around the rotary guides 12 and 14. The primary segment rotary guide 12 includes guide blocks 33 at equally spaced intervals about the perimeter of the rotary guide, and the mid-wing segment rotary guide 14 includes its guide blocks 34, also at equally spaced intervals about the perimeter of the rotary guide 14. The guide blocks 33 and 34, which can be of various configurations, form a surface against which the poultry wings engage as the poultry wings are moved by the shackles about the rotary guides 12 and 14.

An effect of the guide blocks 33 and 34 on the larger perimeter rotary guides 12 and 14 is that they tend to "catch up" to a poultry wing suspended by a shackle since they move at a faster speed than the poultry shackle as the shackles move along the rectilinear segments 29 and 30 with the continuous drive chain 18. However, since the continuous drive chain is of a narrower breadth than the breadth of the shackles moving along the rectilinear segments 29 and 30, the shackles begin to move at the same surface speed of the periphery of the rotary guides as they move around the arcuate portions of the rotary guides 12 and 14, and the guide blocks 33 and 34 progressively move into contact with the poultry wings, assuring that the poultry wings become properly registered at the guide blocks.

It will be noted in FIG. 1 that the turning gears 28 at the top of the shackles rotate in one direction when leaving the mid-wing segment rotary guide 14, and rotate in the opposite direction when approaching the primary segment rotary guide 12. This pattern of rotation reorients the shackles so that the open ends of the shackles face a worker at the loading side 31 of the continuous drive chain 18. But after having been loaded with a wing, the shackles are reoriented so that the closed loop end of the shackles lead as the shackles begin their movements about the primary segment rotary guide 12.

Figure 3:
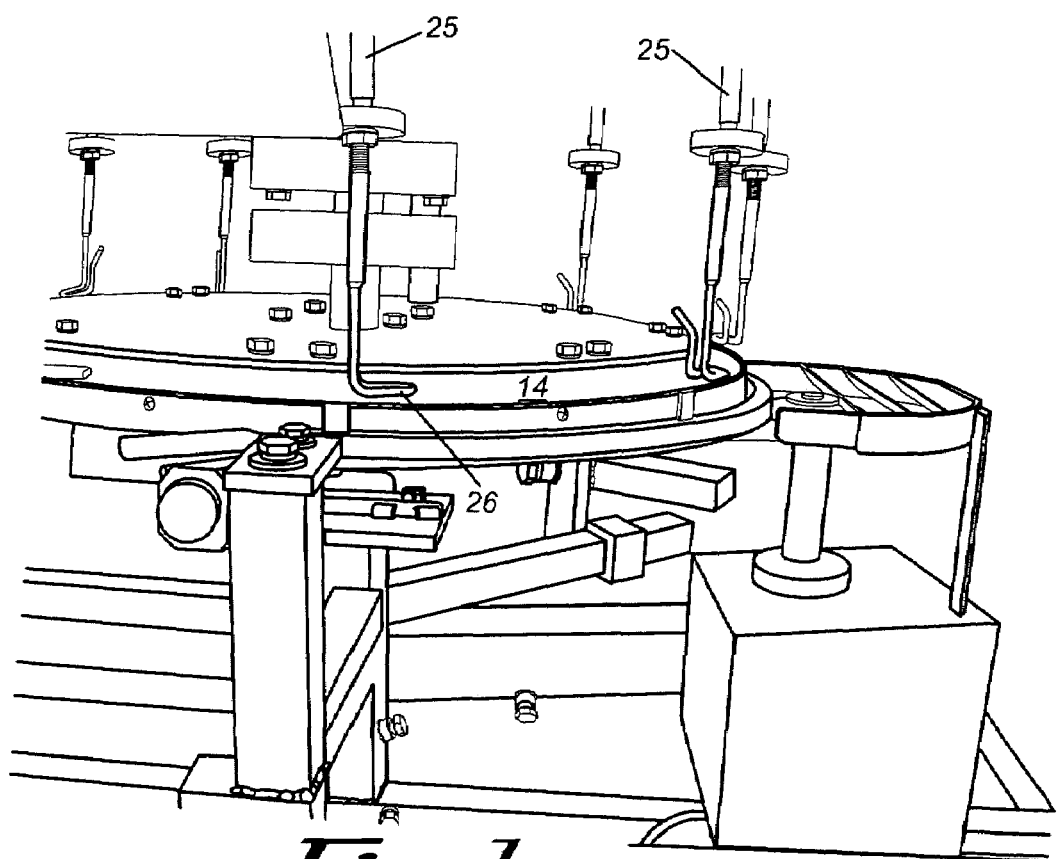
FIG. 3 is a perspective illustration of the rotary guide used for separating the mid-wing segment from the tip segment.
Figure 4:
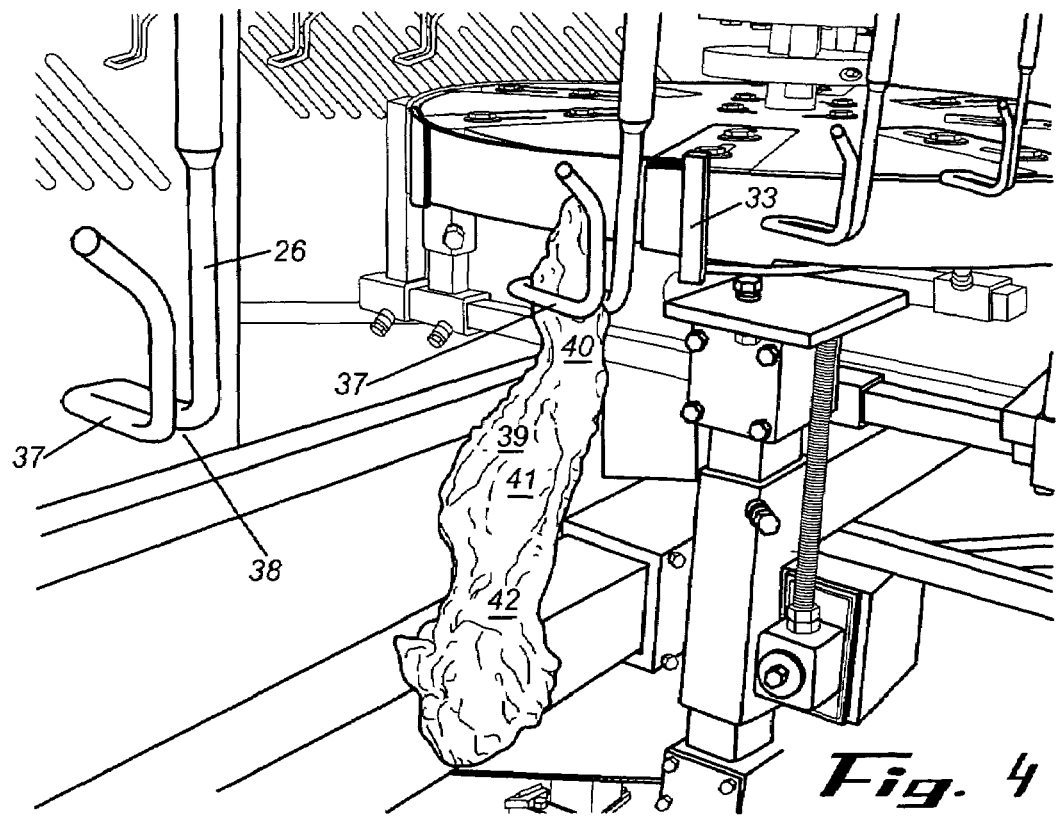
FIG. 4 is a perspective illustration of the shackle used to suspend the wing of a poultry carcass, showing the shackle oriented so that the wing tips of the wings can be easily inserted into the shackles by a person loading the wings into the shackles.
Figure 5:
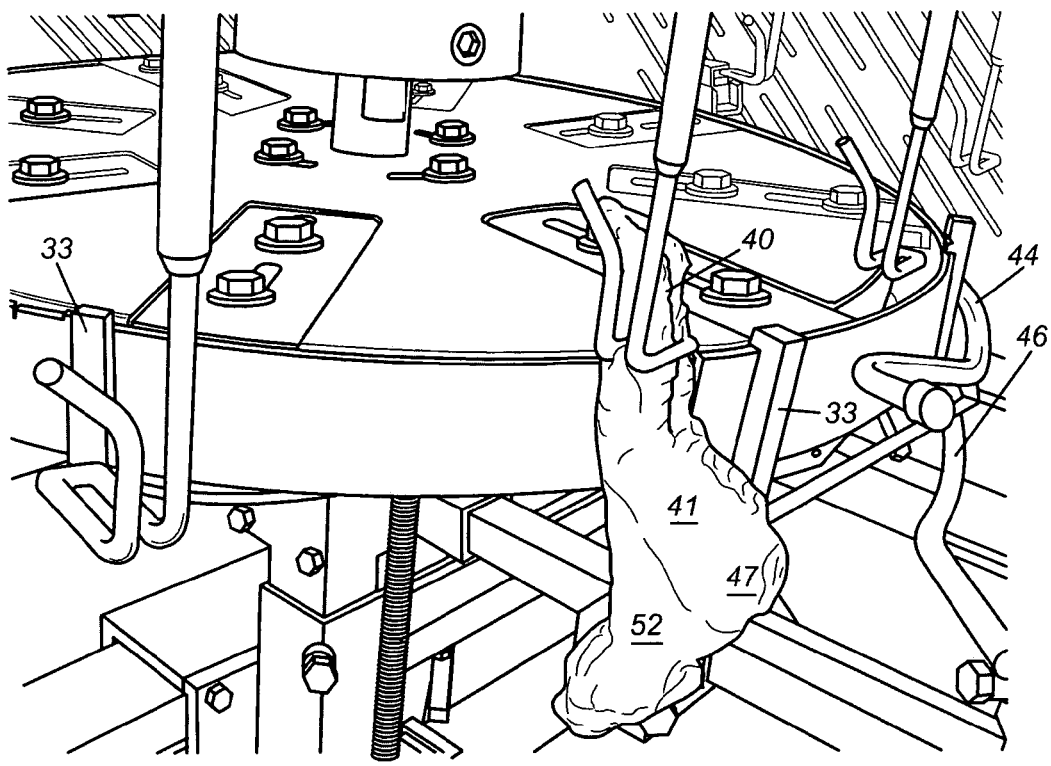
FIG. 5 is a perspective illustration of the shackle as it carries the poultry wing to the rotary guide, showing the shackle turned to its operative position.

As illustrated in FIG. 2, each shackle 26, such as shackle 26A, includes a support stem 36 oriented in an upright attitude and connected at its upper end to a turning gear 28 and carried by a shackle support 25 (FIG. 3). The lower end portion of each shackle includes a U-shaped, horizontally extending carrier 37 that defines an elongated horizontally oriented shackle slot 38 that is open at one end. The person loading the poultry wings 39 on the shackles inserts the tip segments 40 of the wings through the open ends of the carriers 37 of the shackles 26. There are small protrusions from the tip segments 40 that help maintain the wing segments in the slots 38 of the carriers 37 of the shackles. The tip segments become wedged by friction in the slots and the mid-wing segments 41 are suspended below the tip segments 40 and the primary segments 42 are suspended below the mid-wing segments 41. The worker is careful to orient each wing 39 50 that when the shackle is turned to its operative position (FIG. 5), the outside surface of the wing is oriented to the outside of the processing path. This is true for both left and right wings of the carcass, so that in one situation the right wing will have its elbow joint leading in the direction of movement of the wing through the system, and when the left wing is loaded, it will have its elbow joint trailing the wing through the process. This is desired so that the direction of bending of the primary segment of the wing is always toward the outside of the wing, which is the direction in which the opening of the elbow joint can more effectively take place, with less force and with more reliable wing opening without fracture of the bones. This is due to the anatomical structure of the right and left elbow joints of a chicken and of other poultry species.

Figure 6:
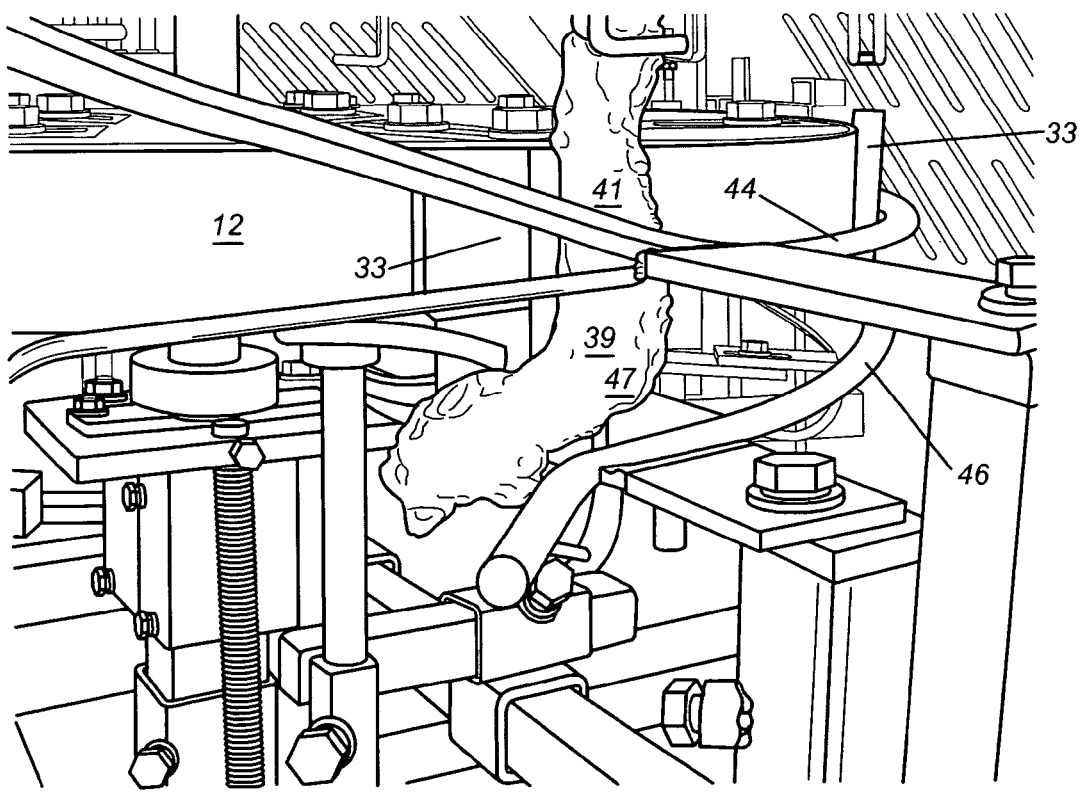
FIG. 6 illustrates the poultry wing as the mid-wing segment is urged against the rotary guide and one of its pusher blocks by the mid-wing guide.
Figure 7:
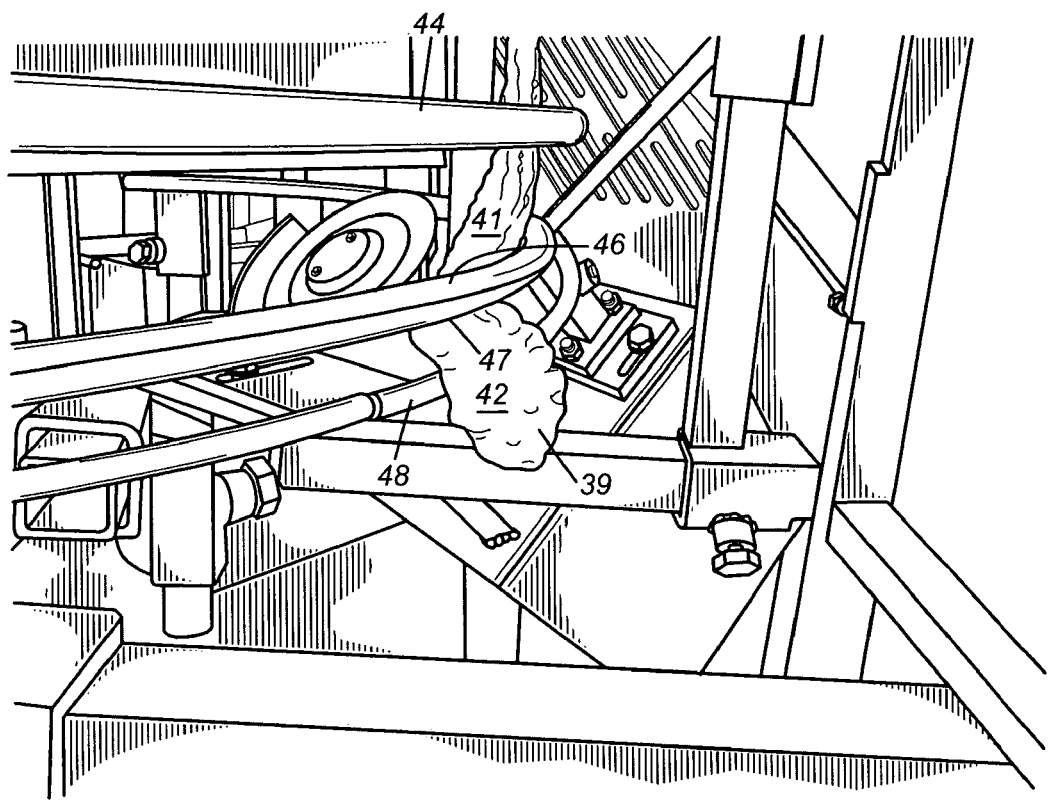
FIG. 7 illustrates the poultry wing as the elbow guide and bending guide begin the outward bending movement of the primary segment about the elbow joint.

As illustrated in FIG. 6, the poultry wings 39 engage a mid-wing guide 44 intermediate the ends of the mid-wing segments. The mid-wing guide is in the form of a stationary curved rod that extends in the processing path adjacent the perimeter of the rotary guide 14. The mid-wing guide urges the mid-wings against the perimeter surface of the primary segment rotary guide 12. In the meantime, the guide blocks 33 move in behind the wings 39 at a faster speed than the movement of the wings until the wings begin to move in an arcuate path about the rotary guide. This assures that the guide blocks 33 will always be properly positioned immediately behind the wings 39 and urge the wings through the arcuate path as the wings are being frictionally engaged by the mid-wing guide 44 and the other guides hereinafter described. This properly orients the wings for the subsequent processes.

As the wings 39 continue in sequence about the rotary guide 12, they are engaged by elbow guide 46 that is spaced below the mid-wing guide 44.and which engages at first slightly above the elbow joints 47 of the wings that connect the primary segments 42 to the mid-wing segments 41. This begins the opening of the elbow joints of the wings. The elbow guide 46 also is in the form of a curved rod.

In the meantime, a bending guide 48 also extends in the curved processing path, but at a level lower than the rotary guide 12. The bending guide, in the form of a curved rod, is sloped from inside the wings 39, outwardly and upwardly, and engages against the primary segments 42 of the wings so as to bend the primary segments 42 laterally and then upwardly about the elbow guide 46. This pivots the bone ends of the primary segments 42 laterally away from the bone ends of the mid-wing segments 41 and opens the elbow joints of the wings. This movement of the bone ends of the primary segments about the elbow guide 46 stretches the tissue extending between the bone ends and tends to separate the tissue from about the bone ends of the primary segments at the elbow joints while the tissue remains connected to the bone ends of the mid-wing segments.

Figure 8:
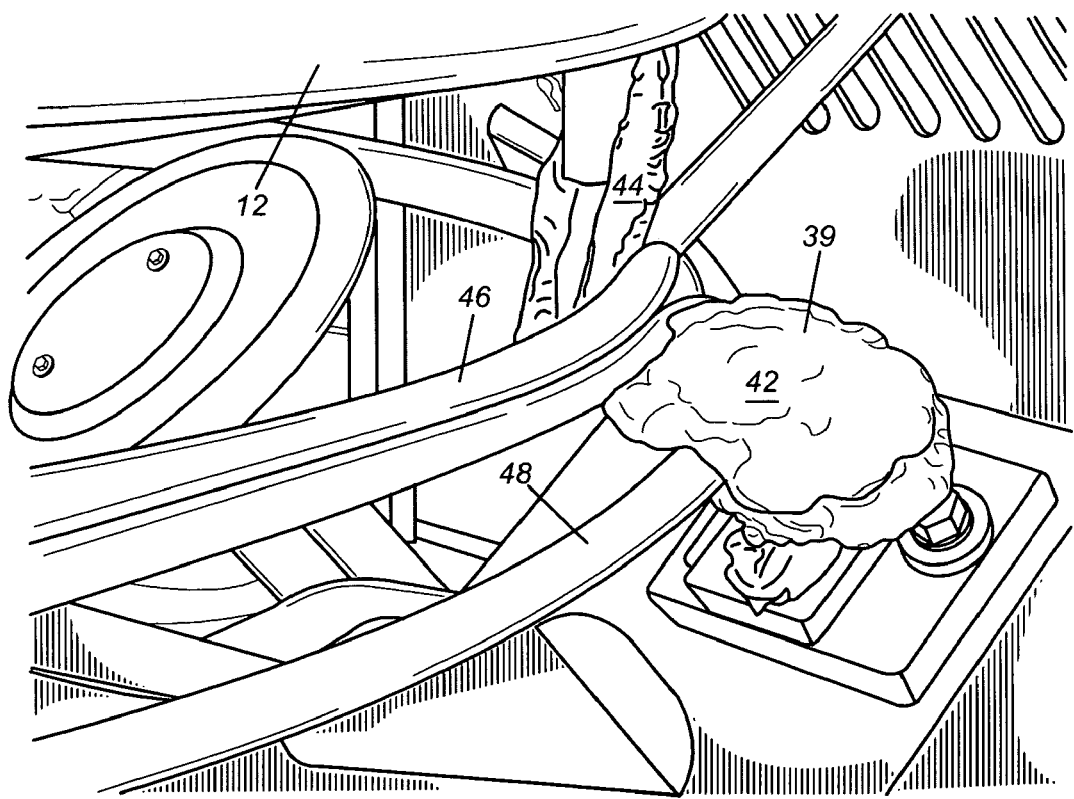
FIG. 8 illustrates the poultry wing as the bending guide further bends the primary segment at the elbow joint about the elbow guide, separating the elbow joint.

As illustrated in FIG. 8, further movement of the wings about the rotary guide 12 causes further upward bending of the wings at their elbow joints. At this position, the bone ends of the primary segments usually pop out laterally away from the mid-wing segments.

Figure 9:
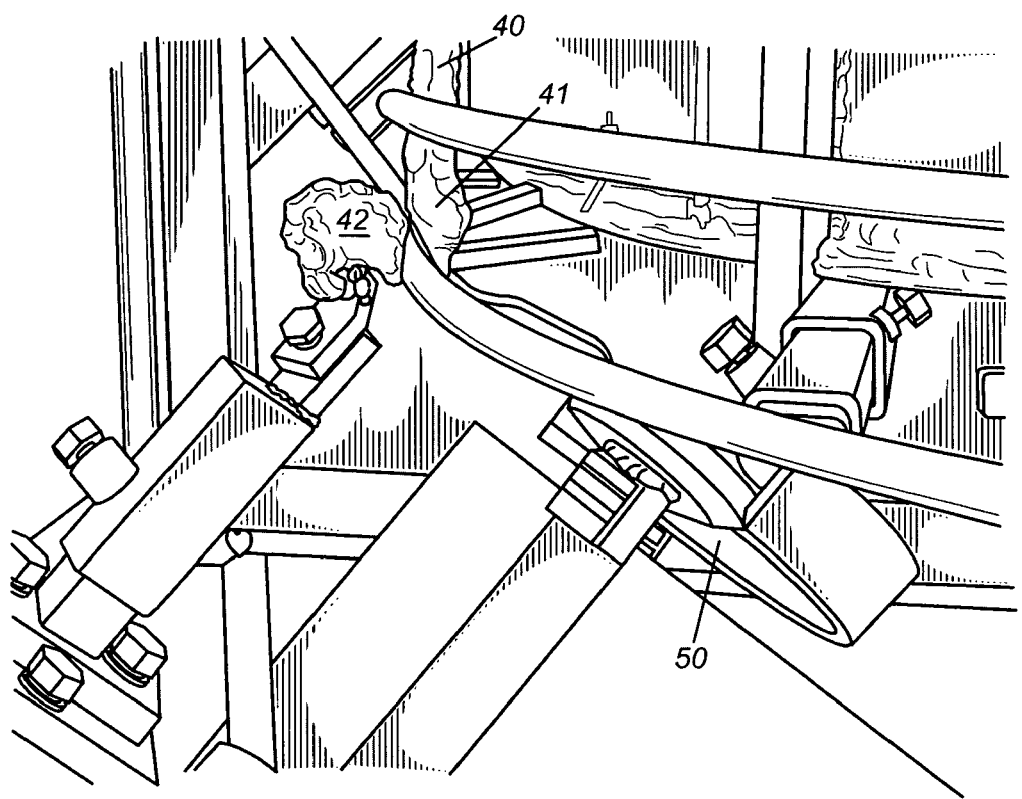
FIG. 9 illustrates the configuration of the wing as a rotary disk cutter begins its cutting function at the elbow joint.

FIG. 9 illustrates the last phase of the bending operation of the primary segments 42 with respect to the mid-wing segments 41, as the wings approach the disk cutter 50. The disk cutter is oriented so that it is in the path traveled by the opened elbow joints and cuts through the tissue that is stretched between the primary segments 42 and the mid-wing segments 41 about the elbow joints. This completely separates the primary segments 42 from the mid-wing segments 41. Since the bones of the elbow joints are separated and are now positioned on opposite sides of the elbow guide, the cutter will not engage the bones as the cutter cuts through the stretched tissue.

Figure 10:
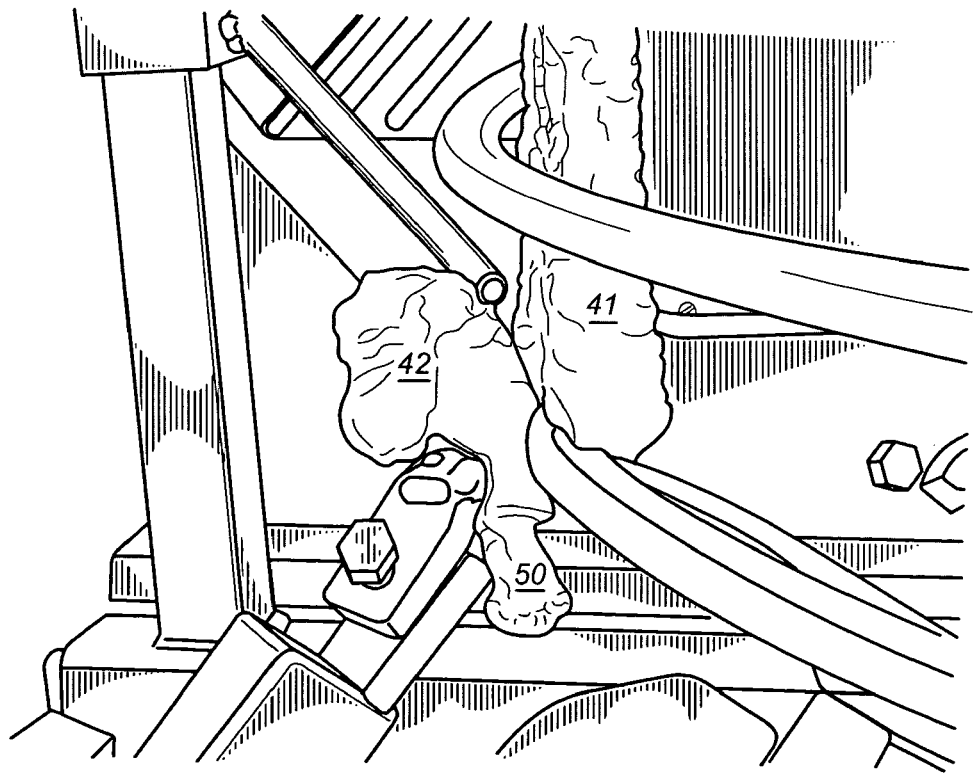
FIG. 10 shows the separated primary segment adjacent the mid-wing immediately after the elbow joint has been opened and the tissue cut through by the cutter, showing the exposed bone end of the primary segment.

FIG. 10 shows a wing immediately after the primary segment 42 has been separated from the mid-wing segment 41, showing the exposed bone end 50 of the separated primary segment 42. The primary segment is now allowed to drop from the apparatus to a receptacle where it is further processed.

Figure 11:
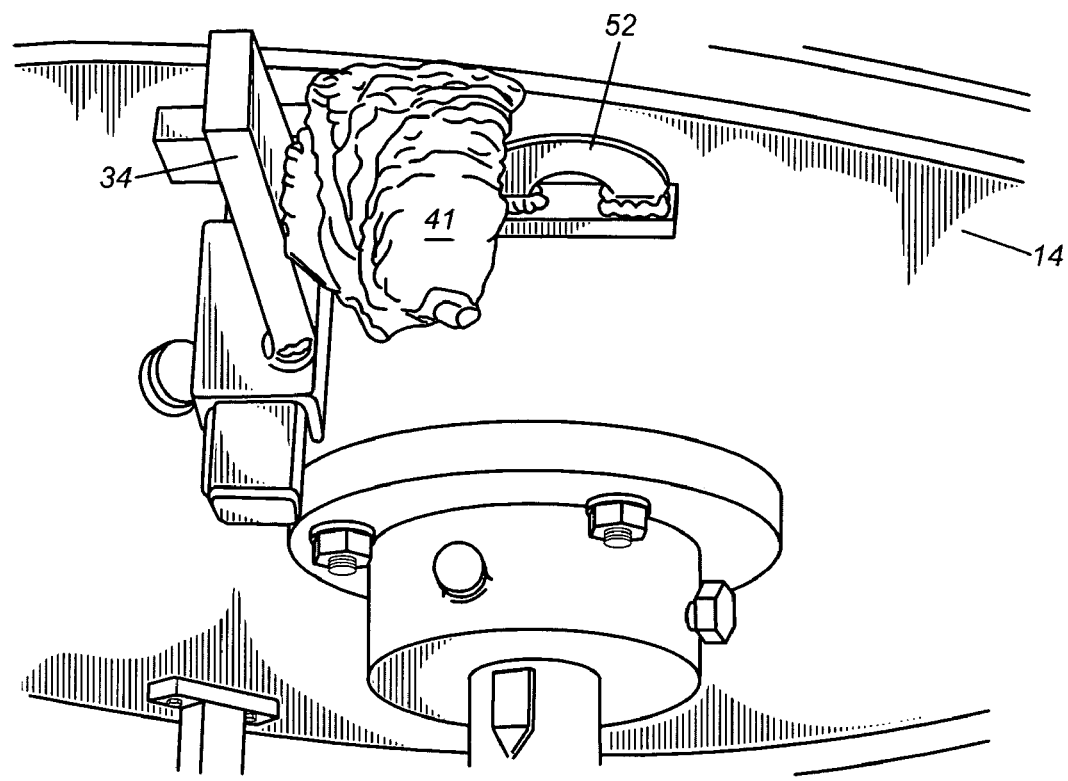
FIG. 11 shows the mid-wing segment as it passes about the second rotary guide.

FIG. 11 shows a mid-wing segment 41 of a wing as it moves about the mid-wing segment rotary guide 14. A tip segment guide 52 extends adjacent the perimeter of the mid-wing segment rotary guide 14 and engages the mid-wing segments 41 and the tip segments 40, at the joint between the segments. The tip segment guide forces the tip segments against the rotary guide 34, compressing and weakening the tip joints. A guide block 34 engages behind the tip and mid-wing segments to assure that they move in unison with the perimeter of the mid-wing segment rotary guide 14.

Figure 12:
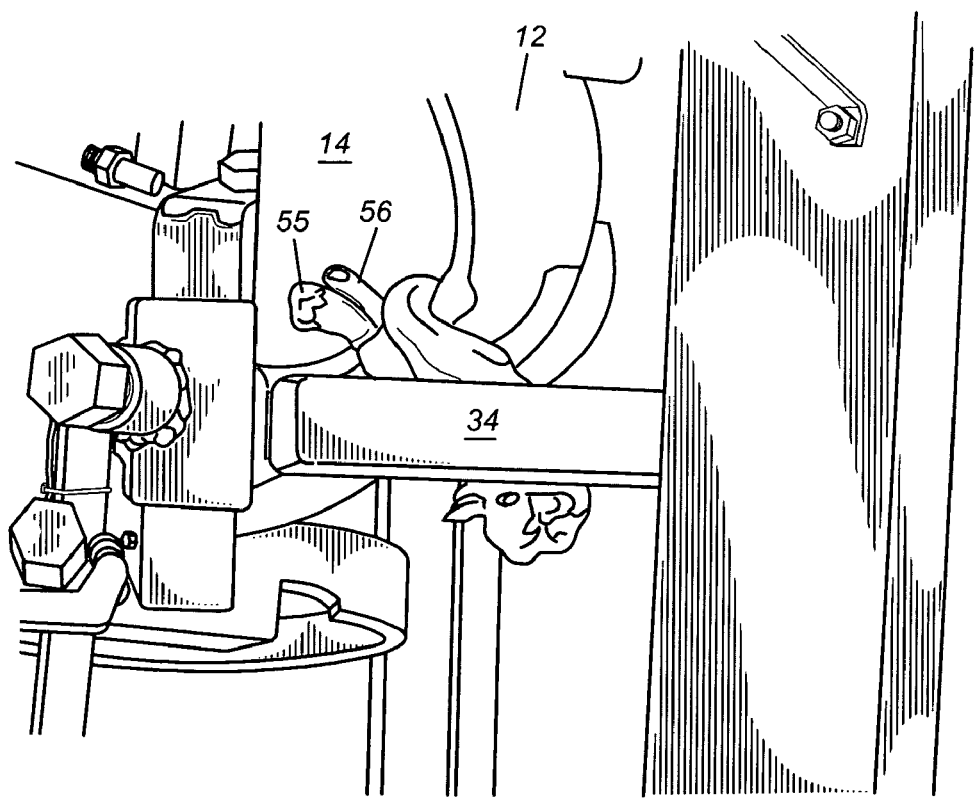
FIG. 12 shows the mid-wing segment as it is bent at its tip segment joint, showing the bone end as it pops out of the tip segment.

As illustrated in FIG. 12, the tip segment guide 52 urges the tip about the lower perimeter edge of the rotary guide 14, urging the bones of the mid-wing segment 41 laterally inwardly beneath the rotary guide 14. The compression of the tip segments together with the lateral force applied to the mid-wing segments urges the bone ends 55, 56 of the mid-wing segment adjacent the tip segment to break away from the tip segment. This tends to "pop" the ends 55 and 56 of the bones of the mid-wing segment 41 out of the skin and other tissue extending between the tip segment 40 and the mid-wing segment 41.

The tissue left extending between the mid-wing segment 41 and the tip segment 40 is cut by a disk cutter, similar to disk cutter 50 of FIG. 9, thereby completely separating the mid-wing segment 41 from the tip segment 40, allowing the mid-wing segment to fall away from the processing path to a receptacle.

Figure 13:
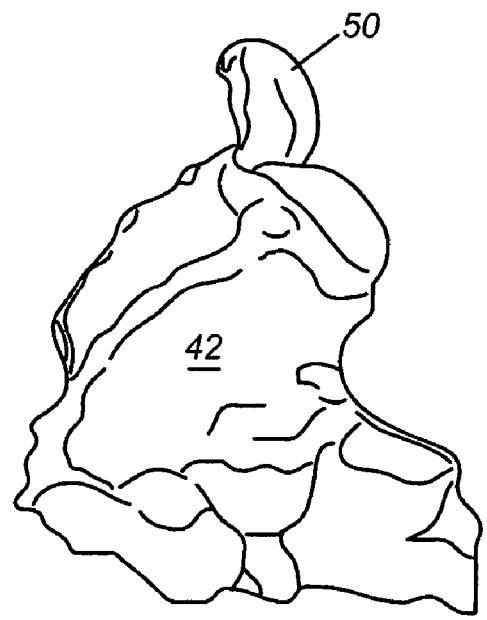
FIG. 13 shows the primary segment that has been separated from the mid-wing segment.

FIG. 13 shows the separated primary segment 42 of a wing with its bone end 50 exposed and protruding out of the meat, with the meat and other tissue clinging to the other portion of the bone.

Figure 14:
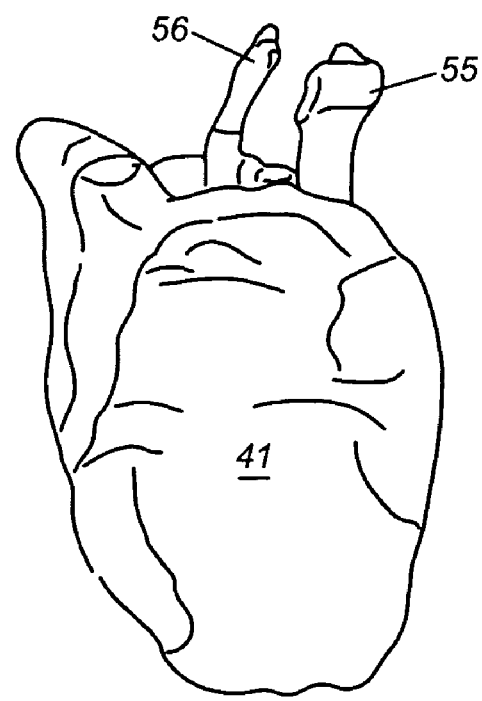
FIG. 14 shows the mid-wing segment that has been separated at opposite ends from the primary segment and the tip segment.

FIG. 14 shows the separated mid-wing segment 41 of a wing with its bone ends 55 and 56 exposed and protruding out from the meat, skin and other tissue clinging to the other portions of the bones.

Once the mid-wing and primary wing segments have been separated and configured as shown in FIGS. 13 and 14, they are accumulated and later cooked for edible consumption. The bone ends 50, 55 and 56 are dried during the cooking process so as to evaporate or otherwise remove or diminish the grease and other matter that would have accumulated on the bone ends, leaving the bone ends dry and suitable for grasping by the human hand as the meat is consumed by a person.

Although preferred embodiments of the invention have been disclosed in detail herein, it will be obvious to those skilled in the art that variations and modifications of the disclosed embodiments can be made without departing from the spirit and scope of the invention as set forth in the following claims.

I claim:

1. A method of partially deboning a poultry wing separated from a poultry carcass, the wing having a primary segment with a bone extending longitudinally therethrough that was separated from a poultry carcass, a mid-wing segment having a pair of bones extending longitudinally therethrough that are joined at an elbow joint to the bone of the primary segment, and a tip segment joined at a tip joint to the bones of the mid-wing segment and extending away from the tip joint, and an inside surface that faced the carcass and an outside surface that faced away from the carcass, comprising:
   suspending the poultry wing from its tip segment at a position away from the tip joint at a protrusion in the tip segment,
   advancing the suspended wing along a processing path with the outside surface of the poultry wing facing one side of the processing path,
   as the wing is advanced:
      bending the primary segment of the wing at the elbow joint with respect to the
   mid-wing segment of the wing laterally about an elbow guide positioned on the outside surface of the poultry wing until the elbow joint is opened,
      as the elbow joint is opened, stretching the tissue extending between the primary segment and the mid-wing segment about the elbow joint,
      separating the stretched tissue extending between the primary segment and the mid-wing segment at the elbow joint at a position that exposes the end of the bone of the primary segment and separates the primary segment from the mid-wing segment,
      such that the tissue about the bone end of the primary segment tends to refract from about the bone end and leave the bone end exposed.

2. The method of claim 1, wherein the step of advancing the wing comprises:
   advancing the wing with the elbow joint extending forwardly in the processing path.

3. The method of claim 1, wherein the step of advancing the wing comprises:
   advancing the wing with the elbow joint extending rearwardly in the processing path.

4. The method of claim 1, wherein
   the step of suspending the poultry wing from its tip comprises wedging the tip segment at the tip protrusion into a slot of a shackle.

5. The method of claim 1, wherein the step of advancing the suspended wing along a processing path comprises:
   advancing the wing along a substantially rectilinear path toward a rotary guide,
   placing the mid-wing segment of the wing in contact with the rotary guide,
   advancing the wing in unison with and about the rotary guide, and
   performing the steps of bending, stretching and separating the wing as the wing advances with the rotary guide.

6. The method of claim 5, wherein the step of advancing the wing in unison with the rotary guide comprises: moving a positioning block in unison with the rotary guide, and engaging the wing with the positioning block.

7. The method of claim 5, wherein
   the step of advancing the wing in unison with the rotary guide comprises:
   advancing the wing along an arcuate path of approximately 180 degrees about an axis of rotation of the rotary guide at a speed greater than the speed at which the wing is advanced along the substantially rectilinear path.

8. The method of claim 5 and further including the step of: maintaining the mid-wing segment in contact with the rotary guide as the primary segment is bent about the elbow guide until the elbow joint is opened and separated.

9. The method of claim 1, and after the primary wing segment has been separated from the mid-wing segment, further including:
   advancing the mid-wing segment and the tip segment along a second processing path,
      as the mid-wing segment and tip segment are advanced along the second processing path:
      compressing the wing tip segment,
      forcing the mid-wing segment laterally with respect to the tip segment, and
   popping the bones of the mid-wing segment laterally from the tip segment,
   such that the end of the bones of the mid-wing are exposed.

10. The method of claim 1, and further including the step of
   cooking the primary segment and the mid-wing segment after they have been separated from each other, such that the ends of the bones of the segments protrude from the tissue remaining on the bones, and are available to be grasped by the human hand without touching the tissue remaining on the bones.

11. A method of deboning a plurality of right poultry wings and left poultry wings separated from a poultry carcass, the right poultry wings having an inside surface that faced the right side of the poultry carcass and an outside surface that faced away from the poultry carcass, the left poultry wings having an inside surface that faced the left side of the poultry carcass and an outside surface that faced away from the poultry carcass, the poultry wings each having a primary segment that was separated from a poultry carcass with a bone extending longitudinally therethrough, a mid-wing segment having a pair of bones extending longitudinally therethrough that are joined at an elbow joint to the bone of the primary segment, and a tip segment joined at a tip joint to the bones of the mid-wing segment and extending beyond the tip joint, comprising:
   suspending the poultry wings from their tip segments,
   advancing the suspended wings in sequence along a processing path with the outside surfaces of the right wings facing one side of the processing path and with the outside surfaces of the left wings facing in the same direction as the outside surfaces of the right wings,
   as the wings are advanced:
      bending the primary segments of both right and left wings with respect to the mid-wing segments at the elbow joints about an elbow guide positioned on the outside surface of the poultry wings until the elbow joints are opened, and
      separating the tissue extending between the primary segments and the mid-wing
   segments at the elbow joints to expose the elbow joints and to separate the primary wing segments from the mid-wing segments at the elbow joints.

* * * * *